(12) United States Patent
Artsiely

(10) Patent No.: US 7,582,224 B2
(45) Date of Patent: Sep. 1, 2009

(54) WORKING FLUIDS FOR AN ABSORPTION COOLING SYSTEM

(75) Inventor: Yehuda Artsiely, Herzelia (IL)

(73) Assignee: Totec Ltd., Ramat Hasharon (IL)

( * ) Notice: Subject to any disclaimer, the term of this patent is extended or adjusted under 35 U.S.C. 154(b) by 0 days.

(21) Appl. No.: 11/770,112

(22) Filed: Jun. 28, 2007

(65) Prior Publication Data
US 2008/0016903 A1    Jan. 24, 2008

(30) Foreign Application Priority Data
Jul. 23, 2006    (IL) .................................. 177021

(51) Int. Cl.
C09K 5/00    (2006.01)
C09K 3/18    (2006.01)

(52) U.S. Cl. .............................. 252/69; 252/67; 252/68; 252/70

(58) Field of Classification Search .................... 252/67, 252/68, 69, 70
See application file for complete search history.

(56) References Cited

U.S. PATENT DOCUMENTS

| | | | | |
|---|---|---|---|---|
| 4,428,854 A | * | 1/1984 | Enjo et al. ..................... | 252/69 |
| 4,793,940 A | | 12/1988 | Borde et al. | |
| 5,425,890 A | * | 6/1995 | Yudin et al. .................... | 252/67 |
| 5,622,644 A | * | 4/1997 | Stevenson et al. ............. | 252/67 |
| 5,826,436 A | * | 10/1998 | Scaringe et al. ............... | 62/114 |
| 6,523,357 B1 | | 2/2003 | Katayama | |
| 6,536,229 B1 | | 3/2003 | Takabatake et al. | |
| 6,564,572 B1 | | 5/2003 | Uchimura et al. | |
| 6,606,868 B1 | * | 8/2003 | Powell et al. .................. | 62/114 |
| 6,629,419 B1 | * | 10/2003 | Powell et al. .................. | 62/114 |
| 6,748,762 B2 | | 6/2004 | Yamazaki et al. | |
| 6,845,631 B1 | | 1/2005 | Hallin et al. | |
| 6,991,743 B2 | * | 1/2006 | Poole et al. .................... | 252/67 |
| 2002/0040975 A1 | * | 4/2002 | Goble .......................... | 252/67 |
| 2008/0016902 A1 | * | 1/2008 | Artsiely ....................... | 62/476 |

OTHER PUBLICATIONS

BOC Gases MSDS for 1-Chloro-1,2,2,2-tetrafluoroethane (R124) dated Feb. 9, 2003.*
BOC Gases MSDS for 1,1,1,2-tetrafluoroethane (R134a) dated May 8, 2003.*

* cited by examiner

Primary Examiner—James Seidleck
Assistant Examiner—Jane L Stanley
(74) Attorney, Agent, or Firm—Lucas & Mercanti, LLP

(57) ABSTRACT

The invention provides a working fluid for an absorption cooling system of the type including a liquid absorbent that remains in the liquid phase throughout the operation cycle, and a refrigerant having both a liquid phase and a vapor phase in the cycle, wherein the system comprises a mixture of between about 2 and 30 w/w % of tetraethylene glycol dimethyl ether (tetraglyme) and between about 98 and 70 w/w % poly(ethylene glycol) dimethyl ether(polyglyme) as the absorbent therein, in combination with a commonly used refrigerant.

4 Claims, 3 Drawing Sheets

WORKING FLUIDS FOR AN ABSORPTION COOLING SYSTEM

The present invention relates to an absorption cooling system.

More particularly, the invention provides an improved absorption refrigeration system utilizing a novel absorbent composition having improved performance properties that raises the COP (Coefficient of Performance).

Absorption refrigerating machines remove heat from the refrigerated load by means of an evaporator which transfers heat from the chilled medium to a refrigerant which evaporates into vapor phase, whereafter a water-cooled absorber, later in the cycle, dissipates heat from said heated vapor. More specifically, a solution of absorbent and refrigerant are passed through a first heat exchanger, referred to as a generator, through which a hot fluid is passed. As a result, part of the refrigerant passes to vapor phase and the resulting two-phase stream is directed to a separator which separates refrigerant gas extracted from said liquid absorbent and remaining liquid refrigerant, referred to as a lean solution. The refrigerant in vapor phase is then passed to an further heat exchanger, referred to as a condenser, which has a cooling fluid passing therethrough, whereby, through heat exchange, the vaporized refrigerant is recondensed to liquid form, and in this condition is passed through an expansion valve and changes its physical condition back to a vapor phase in a third heat exchanger, referred to as the evaporator. This phase change absorbs heat from the chilled media that flows through said evaporator in heat exchange but not physical contact therewith. The refrigerant, still in vapor phase, exits the evaporator and is sent to a jet mixer where it is physically combined with a lean solution from said separator and then sent to a fourth heat exchanger, referred to as an absorber, where the final absorption between the lean solution and the refrigerant which was previously in vapor phase is completed, aided by dissipation of heat via heat exchange through a cooling fluid passing therethrough. The evaporator is operated at a low pressure, while staying above atmospheric pressure at all times, while the condenser works at a high pressure, as in an electrically-driven compression cycle. However, in an absorption machine, the energy required by the evaporator is usually provided by waste heat from an engine or another electricity-generating device, or whatever heat source is cheaply available, while all the energy required by compression refrigerating machines is supplied by electric power or engine power.

Absorption type refrigerating machines are today mostly found in industrial plants where waste process heat, or unutilized flue gas, is readily available, such as in co-generation systems. Electric power generating stations produce vast quantities of waste heat which could be available at the cost of a gas to liquid heat exchanger by building an insulated pipeline and a non-insulated return line. Absorption refrigerating machines are also found in some mobile homes and recreational vehicles where engine exhaust gas, or water from engine cooling, is available at no cost and electric power is in limited supply. Most of the market, and particularly the residential sector, has been captured by compression-type refrigerating machines. These require no costly plumbing from the heat source to the cooling device, but consume much more electric power, and therefore require heavy cables and costly components.

Absorption-type cooling units, often in large sizes, are used industrially for providing chilled water, and where waste steam, hot water or a steady supply or a hot exhaust gas is readily available, prior art absorption machines already outperform compression types. In small installations it is usually not economic to install the piping needed for the absorption-type refrigerating machines in order to save small quantities of electric power. This situation would however change were there available an absorption-type machine with a greatly improved COP, or the cost of electric power rises sharply, which is presently (2005) a likely outcome due to oil prices reaching record highs of around $60 per barrel and higher.

Furthermore, it is possible to raise efficiency for the same cooling capacity and thus requiring a lower amount energy source resulting in the burning of less fossil fuel or the utilization of less electricity from a power station, which in turn also results in a reduction in the burning of fossil fuel, less pollution and especially less emission of $CO_2$ to the atmosphere, which reduction today, is encouraged with monetary incentives.

Thus a process involving a greatly improved COP means that there is a substantial increase in the efficiency of the process. Furthermore, when using solar energy as the energy source, then the system can utilize a smaller collecting area and such a system could be especially effective and economical in a context of solar powered air conditioning.

The state of the prior art can be assessed by a review of recent U.S. patents.

In U.S. Pat. No. 6,523,357 B1 Katayama discloses an absorption refrigerating machines provided with the conventional components but wherein heat exchangers operate by spraying a cold liquid over the outside of piping conveying the hot liquid moving therethrough. The claimed improvement is in the generator arranged to directly introduce exhaust gas or hot water therein, the aim being to allow uninterrupted operation of an engine or turbine from which heat is recovered even when it becomes necessary to shut down the refrigerating machines in response to declining cooling demand.

Takabatake et al. disclose a steam type absorption refrigerating machines in U.S. Pat. No. 6,536,229. In addition to the conventional components the refrigerating machines includes a fluid concentrating boiler and separate heat exchangers for low and high temperature fluid. The aim is to improve the performance of a steam-type double-effect absorption refrigerating machines.

In U.S. Pat. No. 6,564,572 B1 Uchimura et al propose a compact absorption refrigerating machines for central air conditioning systems intended primarily for installation in a cellar or on a rooftop where a high device would be impossible or objectionable. This is achieved by producing the absorber, the evaporator, the regenerator and the condenser all as liquid film type heat exchangers arranged in one horizontal plane.

The absorption refrigerating machines disclosed by Yamazaki et al. in U.S. Pat. No. 6,748,762 B2 is aimed at corrosion prevention caused by water vapor condensing out of the exhaust gas in a heat exchanger recovering heat from exhaust gas. A heat sensor monitors the temperature of the gas section of the heat exchanger. A controller calculates when it is necessary to direct a hot absorption liquid to warm the exhaust pipe to prevent the accumulation of water therein.

A vertically divided absorption refrigerating machines cabinet is seen in U.S. Pat. No. 6,845,631 to Hallin et al. The evaporator tube passes in series through both compartments, the colder compartment being upstream from the warmer (less-cold) compartment The present inventor has developed an absorption refrigerating machine which will be referred to as an E-4 machine, which is shown in FIG. 1 and marked prior art. The E-4 machine has been found to operate satisfactorily, although it cannot operate below 0° C. and has a COP of 0.58 at 5° C., and 0.6-0.7 at 7° C., which is the COP of the commercially used lithium bromide system and a COP of 0.42 at 0° C.

As is known, however one of the problems in providing an improved absorption refrigerating machine is the refrigerant and absorbent fluids to be used therein.

In U.S. Pat. No. 4,793,940 there is described the search for an appropriate refrigerant absorbent combination.

As described therein, among the absorbents investigated were representatives of groups of different chemical nature, such as, N-methyl-2-pyrrolidone, N-methyl-ε-caprolactam, dimethyl-methylphosphonate, dimethylether of tetraethylene glycol, and dimethyl formamide. In said patent, it was described that a synergistic effect is achieved with dimethyl formamide at mixed with N-methyl-2-pyrrolidone.

As stated in said patent, combinations of R-22 with the absorbents mentioned above, eliminates the safety problems encountered with ammonia-water systems, and the crystallization and corrosion problems of water-lithium bromide systems.

After further testing and comparisons of advantages and results, said patent chose diflourochloromethane, known as R-22 as its refrigerant, and it was found that N-methyl-2-pyrrolidone was the best absorbent to use therewith.

According to the present inventions it has now been surprisingly discovered that the use of an absorbent mixture of tetraethylene glycol dimethyl ether (tetraglyme) and poly (ethylene glycol) dimethyl ether (polyglyme) in a specific ratio range results in a synergistic and unexpected contribution to the increase in the COP of the system.

Thus according to the present invention, there is now provided a working fluid for an absorption cooling system of the type including a liquid absorbent that remains in the liquid phase throughout the operation cycle, and a refrigerant having both a liquid phase and a vapor phase in said cycle, wherein said system comprises a mixture of between about 2 and 30 w/w % of tetraethylene glycol dimethyl ether (tetraglyme) and between about 98 and 70 w/w % poly (ethylene glycol) dimethyl ether (polyglyme) as the absorbent therein, in combination with a commonly used refrigerant.

Since this working fluid is not combustible, is non-explosive, non-corrosive and not toxic, it is environmentally friendly and very convenient for use.

In preferred embodiments of the present invention, said system comprises a mixture of between 5 and 25 w/w % of tetraglyme and between about 95 and 75 w/w % polyglyme as the absorbent therein.

In especially preferred embodiments of the present invention, said system comprises a mixture of between 10 and 20 w/w % of tetraglyme and between about 90 and 80 w/w % polyglyme as the absorbent therein.

In the article "Experimental and predicted excess enthalpies of the working pairs (methanol or trifluoroethanol+polyglycol ethers) for absorption cycles" by E. R. Lopez, et al, Fluid Phase Equilibria 133 (1997) 229-238, there is described the use of methanol and 2,2,2-trifluoroethanol as refrigerants and poly(ethylene glycol) dimethyl ether and tetraethylene glycol dimethyl ether as absorbents but said article neither teaches nor suggests the unexpected synergy in COP exhibited by the combination of a mixture of between about 2 and 30 w/w % of tetraethylene glycol dimethyl ether (tetraglyme) and between about 98 and 70 w/w % poly (ethylene glycol) dimethyl ether (polyglyme) as the absorbent, and in fact shows and teaches a combination of 50/50 w/w %, which combination has been found according to the present invention to exhibit a minimum in COP and in its cooling effect as seen in FIG. 3 appended hereto.

A problem dealt with already in the prior art is the choice of a suitable environmentally acceptable refrigerant.

As described, e.g., in U.S. Pat. No. 5,425,890, chlorinated fluorocarbon refrigerants (CFC) have been implicated in causing environmental damage. Specifically, these gases which are very inert, are released from the refrigeration systems at ground level and diffused into the upper atmosphere. Because of their inertness, the gases are able to survive without decomposition until they reach the stratosphere where they are broken down by ultraviolet radiation, releasing chlorine atoms which break down the stratospheric ozone layer and contribute to the green house effect. There has recently been considerable concern about reductions in stratospheric ozone levels and this has led to bans on certain CFC's such as R-12, R-11, and others.

Said patent therefore proposes the use of a new refrigerant mixture of a tetrafluoroethane also known in the industry as R-134a, a monochlorotetrafluoroethene, known in the industry as R-124, and a butane.

For use in the present invention preferably the refrigerant comprises at least one fluorohydrocarbon.

In especially preferred embodiments, the refrigerant comprises at least one fluoroethene.

In the most preferred embodiments of the present invention, said refrigerant is formed of a combination of the tetrafluoroethene R-134a, 1,1,1,2,-tetrafluoroethane, and the monochlorotetrafluoroethene R-124, 1-chloro-1,2,2,2,-tetrafluoroethane, and the butane R-600, n-butane, which combination is known as R-416a.

Other refrigerants which can be used in the present invention, include $C_2HF_5$ known as R-125, $C_3H_3F_5$ known as R-218, $C_4F_8$ known as R-318, and $C_3HCl_2F_3$ known as R-123, as well as 50/50% blends of $CH_2F_2/CHF_2CF_3$ known as R-410A, and a blend of 23% (HFC-32)($CH_2F_2$), 25% (HFC-125) ($CHF_2CF_3$) and 52% (HFC-134a)($CH_2FCF_3$) known as R-407C.

In one absorption cooling system including a liquid absorbent that remains in the liquid phase throughout the operation cycle, and a refrigerant having both a liquid phase and a vapor phase in said cycle, the basic system being powered by heat extracted from a hot fluid and powered auxiliary components. A system including five basic components: i.e., a generator, an economizer, a condenser, an evaporator and an absorber, and further including a fluid circuit for the rich solution including a circulation pump, a fluid circuit for the lean solution, and for the refrigerant gas extracted from said liquid absorbent and replaced therein, partial circuits for hot fluid and for a cooling fluid, a jet mixer operating to mix saturated refrigerant gas with said lean solution to re-form said rich solution, includes installing means for increasing the pressure of said saturated refrigerant gas flowing from said evaporator to said jet mixer.

In said improved machine there is introduced the concept of increasing the velocity of the gas entering the lean liquid flowing through the jet mixer which in turn increases the velocity of the fluid passing through the various heat exchangers. The faster flow improves the heat transfer coefficient in the heat exchangers through which the refrigerant passes and thus allows the reduction of their size and cost.

There are however further advantages in increasing the flow and pressure of the newly-mixed rich solution leaving the jet pump, which item can now be made smaller. With the new pressure rise of the rich solution a lower pressure differential needs to be overcome by the circulation pump, which can now be made smaller and consumes less electric power. The power saved by the smaller circulation pump is almost equal to the power required by the newly added gas compressor. Consequently there is little change in the overall electric consumption of the E-5 refrigerating machines of said copending application in comparison with the E-4 model.

Furthermore, there is a much lower consumption if compared to a compression type cooling wherein the typical electricity consumption for compression type cooling is 1.28 Kilowatts per ton of refrigeration, wherein the electricity consumption for the E-5 system is about 0.32 Kilowatts per ton of refrigeration (Kw/TR).

The working fluid of the present invention has been found to improve the performance of both the prior art E-4 system as well as that of the newly proposed E-5 system.

The invention will now be described in connection with certain preferred embodiments with reference to the following illustrative examples and figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
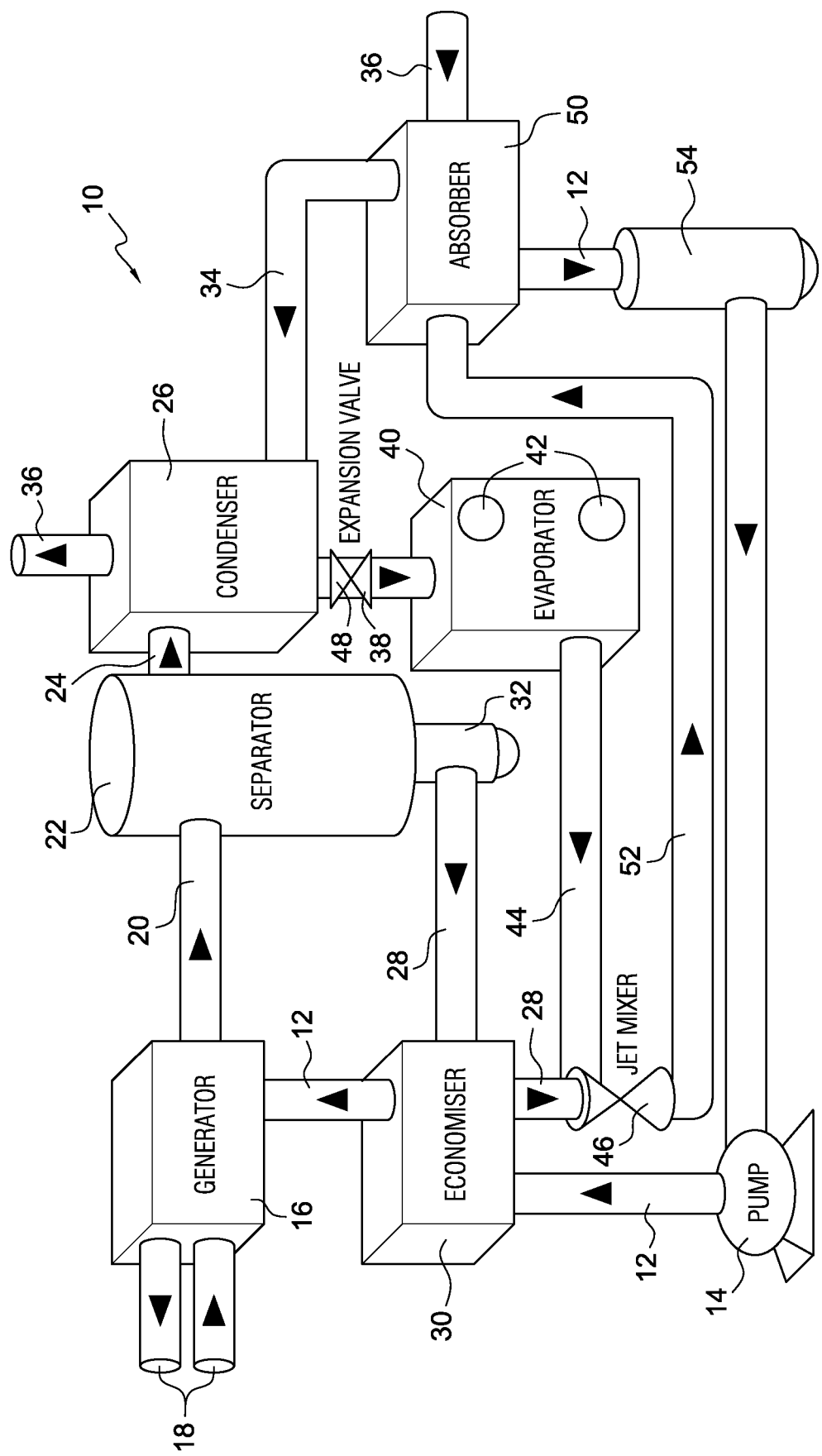
FIG. 1 is a simplified schematic view of an E-4 prior art cooling system.

There is seen in FIG. 1 a prior art cooling system describing the E-4 machine 10. A vapor-saturated refrigerant 12 is driven in a circuit by a circulation pump 14 and is heated in a generator 16. The generator 16 is a heat exchanger through which hot fluid 18 (usually steam, flue gases or hot water) flows driven by external means. The heated rich solution 20 refrigerant starts to boil and enters a separator 22 wherefrom superheated vapor 24 goes to a high-pressure condenser 26. From the lower part 32 of the separator 22 a hot lean solution 28 resulting from loss of refrigerant enters an economizer 30, which is a heat exchanger which extracts heat from the lean solution 28. This heat is added to the rich solution 12 in the economizer 30. A condenser 26 is a high pressure heat exchanger cooled by a stream of cold water 34 driven in an external circuit 36. The condenser 26 cools the refrigerant vapor to reach its liquid phase and is then at about room temperature and under pressure. The refrigerant liquid 48 now passes through an expansion valve 38 and then enters an evaporator 40 which is a low-pressure heat exchanger. The load liquid circuit 42 is cooled in the evaporator 40 while the refrigerant is heated to form a saturated vapor 44. The refrigerant phase change from a liquid to a vapor requires the addition of heat, which heat is extracted from the load 42 which is chilled, producing refrigeration. The saturated vapor 44 is then piped to a jet mixer 46 to be partially reabsorbed by the lean solution 28 to form a mixture 52. The re-absorption of the vapor 44 is completed in an absorber 50 which is also cooled by the cooling water 34 in circuit 36. From the absorber 50 the now reconstituted rich solution 12 is piped to a priming tank 54 and feeds the circulation pump 14.

Figure 2:
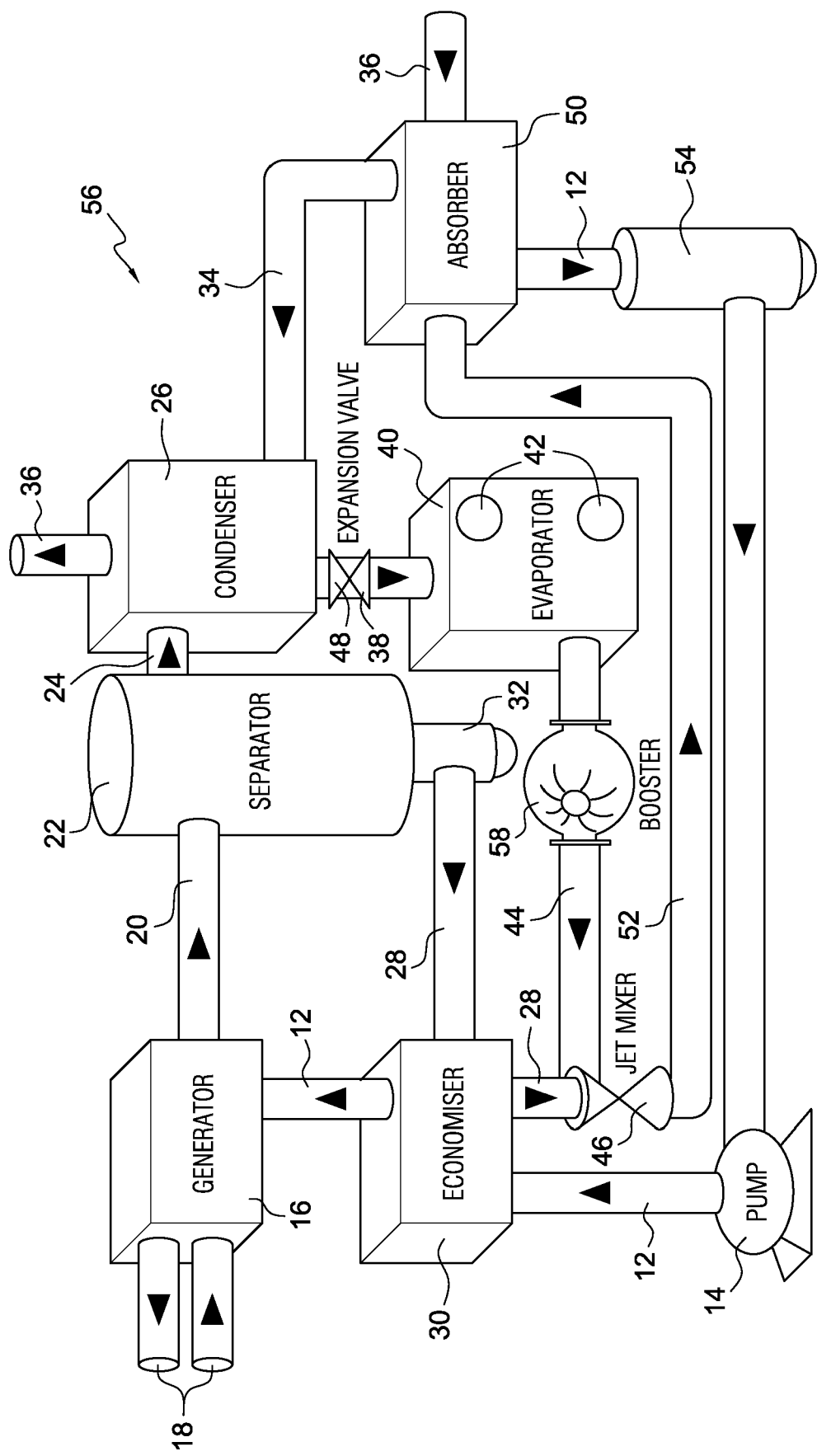
FIG. 2 is a simplified schematic view of a preferred embodiment of the cooling system, designated E-5, according to the present invention.

With regard to FIG. 2, similar reference numerals have been used to identify similar parts. The figure shows in simplified form an E-5 machine 56 according to the present invention.

An electrically-driven centrifugal gas compressor 58 is installed for increasing the pressure and flow of the saturated refrigerant vapor 44 flowing from the evaporator 40 to the jet mixer 46, although any suitable compressor can be used. In any case the flow and pressure of the vapor 44 is increased.

With regard to the increased flow rate, an improved heat-transfer co-efficient results as the fluid circulates faster in the various heat exchangers. This allows reducing the size of said heat exchangers, saving cost, volume and weight. The increased pressure resulting in the newly recombined refrigerant 52 also allows a reduction in the size of the circulation pump 14 with attendant savings in initial and running costs, by means of lower electricity consumption, because the pressure differential to be overcome by the pump 14 is reduced,

EXAMPLE 1

Tests for COP

A. In order to determine and prove the synergistic effect of a specific ratio of tetraglyme and polyglyme, there were first defined 6 different blend ratios for concentration of tetraglyme (designated T in FIG. 3), in the mixture of tetraglyme and polyglyme (designated T plus P in FIG. 3).

B. By thermodynamic calculations, the approximate ratio of refrigerant to absorbent was found (which ratio remained constant for all of the COP tests).

C. Working fluids were drained from an E-4 machine as described above with reference to FIG. 1, which was then put under vacuum for 24 hours in a warm-up cabinet.

D. The machine was charged with the blend ratio defined for point 1 which was P only.

E. The machine was charged with refrigerant according to the ration in step B above.

F. Step C was repeated.

G. Step D was repeated with the blend ratio defined for point 2.

H. Steps F and G were repeated, reactivating the machine in the same way for each of the defining 6 points.

Figure 3:
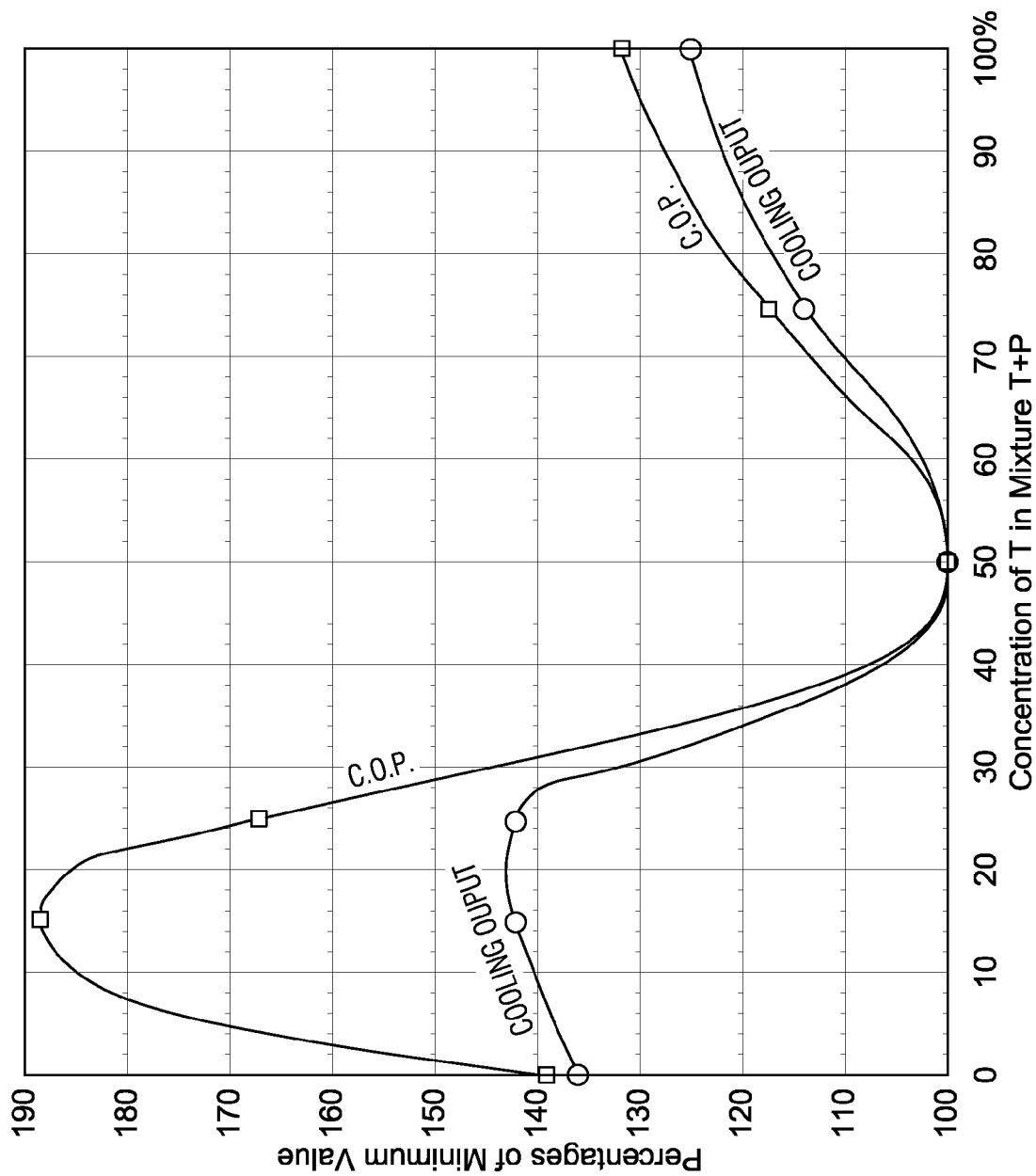
FIG. 3 is a graph plotting the cooling output as well as the COP of mixtures of tetraglyme and polyglyme.

At each point, measurements were taken and the COP calculated, the results of the COP at the 6 points were then presented in graphical form, said graph being attached hereto as FIG. 3.

EXAMPLE 2

Tests for Cooling Output

A. The entire procedure was repeated for the absorbent blend for the 6 points but charged each time with the minimum quantity of refrigerant as a starting point using the calculation of step B of Example 1.

B. Measured small quantities of refrigerant were added, the parameters were measured enabling the calculation of the cooling output and the max/min point was found.

C. The results were drawn on the graph of FIG. 3.

FIG. 3 is a graphical representation of cooling output and COP as a function of the concentration of tetraglyme in polyglyme and as can be seen, a significant and unexpected synergistic effect is achieved when said absorbent system comprises a mixture of between about 2 and 30 w/w % of tetraethylene glycol dimethyl ether(tetraglyme) and between about 98 and 70 w/w % poly (ethylene glycol) dimethyl ether (polyglyme) as the absorbent therein.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A working fluid for an absorption cooling system of the type including a liquid absorbent that remains in the liquid phase throughout the operation cycle, and a refrigerant having both a liquid phase and a vapor phase in said cycle, wherein said liquid absorbent comprises a mixture of between about 10 and 20 w/w % of tetraethylene glycol dimethyl ether and between about 90 and 80 w/w % polyethylene glycol dimethyl ether.

2. A working fluid according to claim 1 wherein the refrigerant comprises at least one fluorohydrocarbon.

3. A working fluid according to claim 1 wherein the refrigerant comprises at least one fluoroethane.

4. A working fluid according to claim 1 wherein said refrigerant is formed of a combination of 1,1,1,2,-tetrafluoroethane, 1-chloro-1,2,2,2-tetrafluoroethane and n-butane.

* * * * *